(12) United States Patent
Saito (10) Patent No.: US 8,416,448 B2
(45) Date of Patent: Apr. 9, 2013

(54) PRINTING APPARATUS

(75) Inventor: Daisuke Saito, Ami-machi (JP)

(73) Assignee: Riso Kagaku Corporation, Tokyo (JP)

( * ) Notice: Subject to any disclaimer, the term of this patent is extended or adjusted under 35 U.S.C. 154(b) by 1307 days.

(21) Appl. No.: 12/217,976

(22) Filed: Jul. 10, 2008

(65) Prior Publication Data

US 2009/0021762 A1    Jan. 22, 2009

(30) Foreign Application Priority Data

Jul. 19, 2007   (JP) ................................. 2007-187798

(51) Int. Cl.
    G06K 15/00   (2006.01)
(52) U.S. Cl.
    USPC ......... 358/1.18; 358/1.13; 358/538; 358/528; 399/389; 399/376; 399/370; 399/361; 399/86
(58) Field of Classification Search .................. 399/389, 399/376, 370, 361, 86; 358/1.13, 1.18, 538, 358/528

See application file for complete search history.

(56) References Cited

U.S. PATENT DOCUMENTS

| | | | | |
|---|---|---|---|---|
| 5,053,885 A | * | 10/1991 | Telle | 358/449 |
| 5,719,968 A | * | 2/1998 | Hashimoto et al. | 382/288 |
| 2004/0252286 A1 | * | 12/2004 | Murray et al. | 355/28 |

FOREIGN PATENT DOCUMENTS

| | | |
|---|---|---|
| JP | 4-220776 | 8/1992 |
| JP | 7-327129 | 12/1995 |
| JP | 11-224177 | 8/1999 |
| JP | 2000-270196 | 9/2000 |
| JP | 2004-104324 | 4/2004 |

* cited by examiner

Primary Examiner — King Poon
Assistant Examiner — Lawrence Wills
(74) Attorney, Agent, or Firm — Matthew K. Ryan; Brian M. McGuire; Frommer Lawrence & Haug LLP (57) ABSTRACT

A printing apparatus is disclosed, which includes: a printing unit including print sheets having different sizes, the printing unit being able to print selectively on any of the print sheets; an original document size determining unit to determine the size of an original document; a scanning unit to scan the original document; a region recognizing unit to recognize a region to be printed in the original document; a deciding unit to decide a print sheet size being larger than the region to be printed and smaller than the size of the original document by comparing the sizes of the print sheets with the size of the original document and the size of the region to be printed; and a controlling unit to cause printing of the image of the region to be printed at 100% magnification on the print sheet of the decided size.

9 Claims, 6 Drawing Sheets

PRINTING APPARATUS

BACKGROUND OF THE INVENTION

1. Field of the Invention

The present invention relates to a printing apparatus with a printing unit that can carry out printing selectively on one of print sheets having different sizes.

2. Description of the Related Art

Printing apparatuses that can carry out printing of a scanned original document selectively on a plurality of print sheets having different sizes have conventionally been used. In such printing apparatuses, the size of the original document is compared with the size of a print sheet on which the image of the original document is to be printed, and the image of the original document is scaled to the size of the print sheet before being printed.

Further, in a printing apparatus proposed in Japanese Unexamined Patent Publication No. 7 (1995)-327129, an effective image area is detected from a scanned original document, and the detected effective image area is scaled to the size of a print sheet before being printed, in order to provide a uniform layout of duplicated documents.

A method for recognizing such an effective image area is described, for example, in Japanese Unexamined Patent Publication No. 4(1992)-220776, where an image of a scanned original document is displayed on a display device, and an effective image area in the original document specified by a user with a pointing device is recognized.

On the other hand, in an image scanning device proposed in Japanese Unexamined Patent Publication No. 2000-270196, an original document provided in advance with an area to be read in the form of a frame is scanned, and an image within the area to be read in the scanned original document is recognized as the effective image area.

Figure 1:
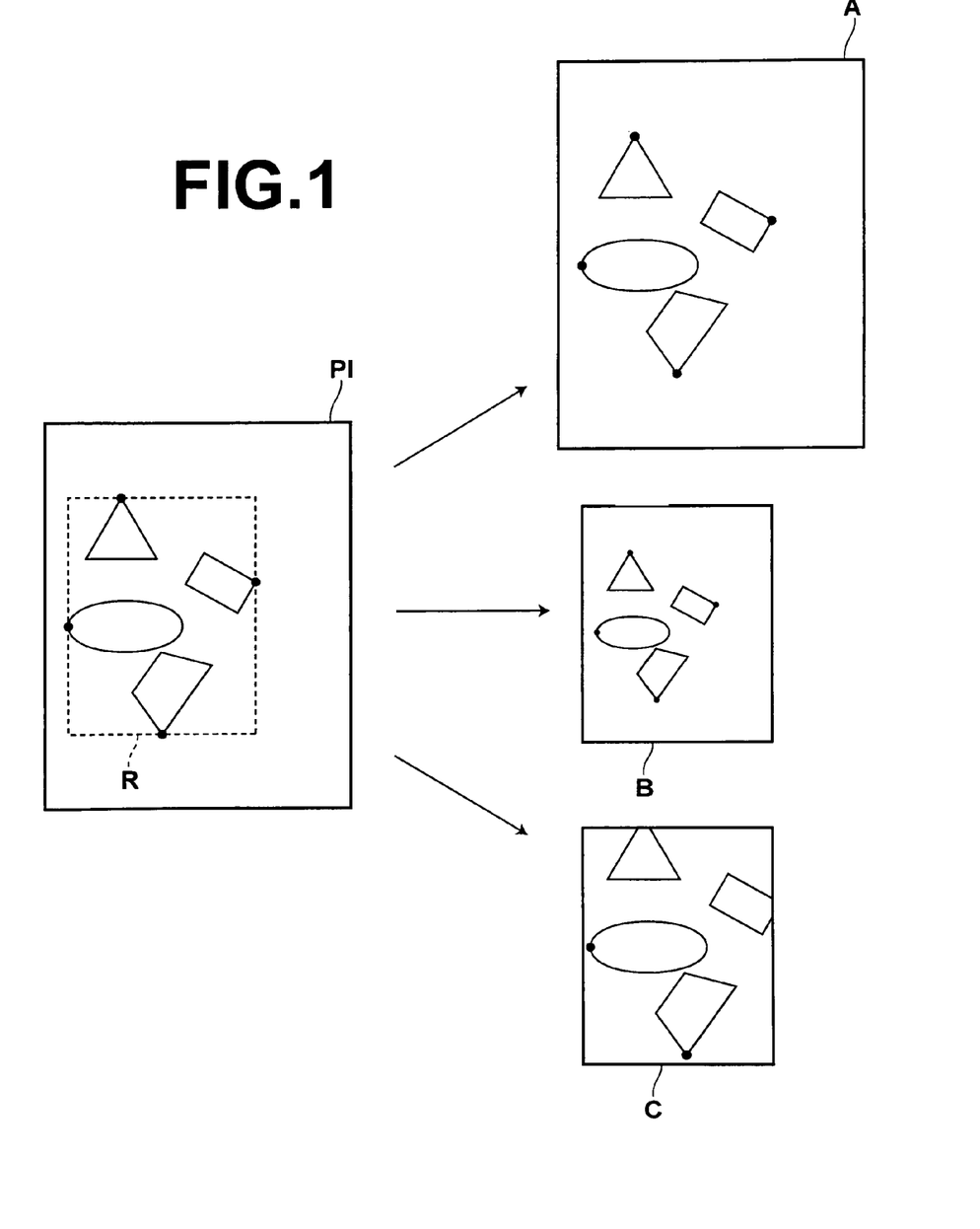
FIG. 1 is a diagram illustrating one example of printed documents obtained by printing an original document according to conventional techniques.

As shown in FIG. 1, in a case where an original document PI, which is an A3 size sheet, containing image information in a region R of about A4 size is scanned and printed on a print sheet, if the entire image of the original document is printed on an A3 size print sheet at 100% magnification, as the printed document A, the document contains a blank space and this is a waste of paper resources.

In contrast, if the entire image of the original document is reduced to the size of an A4 size print sheet, which is a size smaller than the size of the original document, and printed on an A4 size print sheet, as the printed document B, saving of paper resources can be achieved, however, legibility of the document lowers since the image of the original document is reduced.

In a printing apparatus disclosed in Japanese Unexamined Patent Publication No. 7-327129, in which only the effective image area of the scanned original document is scaled to the size of a print sheet to be printed, the effective image area is scaled at a magnification that varies depending on the size of the detected effective image area, and this may lower legibility of the printed document.

Further, when a user places an original document on an original document platen of the printing apparatus to carry out printing, the user can determine the size of a print sheet (A4 size in this example) that is smaller than the size of the original document PI and large enough to contain the region R, and position the original document PI on the original document platen such that the region R fits in a scanning area corresponding to A4 size on the original document platen, to print the image information in the region R on the A4 size print sheet. However, this requires the user to carry out a troublesome operation of positioning the original document PI with checking the position of the region R relative to the original document platen. In addition, if the user has positioned the original document PI incorrectly, the printed document may contain incomplete image information, as the printed document C shown in the drawing.

SUMMARY OF THE INVENTION

In view of the above-described circumstances, the present invention is directed to providing a printing apparatus that allows effective use of paper resources and avoids lowering of legibility in a case where an original document containing a blank space is scanned and printed.

The printing apparatus of the invention includes: a printing unit including a plurality of print sheets having different sizes, the printing unit being able to carry out printing selectively on any of the print sheets; an original document size determining unit to determine a size of an original document; a scanning unit to scan the original document; a region recognizing unit to recognize a region to be printed in the original document scanned by the scanning unit; a deciding unit to decide a print sheet size being larger than the region to be printed and smaller than the size of the original document by comparing the sizes of the print sheets with the size of the original document determined by the original document size determining unit and a size of the region to be printed recognized by the region recognizing unit; and a controlling unit to cause printing of an image of the recognized region to be printed at 100% magnification on one of the print sheets having the size decided by the deciding unit.

In the above-described apparatus, if there are more than one print sheet sizes being larger than the region to be printed and smaller than the size of the original document, the deciding unit may decide the smallest size among the more than one print sheet sizes.

The above-described apparatus may further include a setting unit to set priorities between the sizes of the print sheets to be used for printing, and if there are more than one print sheet sizes being larger than the region to be printed and smaller than the size of the original document, the deciding unit may decide a size having the highest priority set by the setting unit among the print sheet sizes.

The region recognizing unit may automatically detect and recognize the region to be printed.

The region recognizing unit may include a display unit to display an image scanned by the scanning unit and an input unit to input specification of a region of interest within the image displayed on the display unit, and the region recognizing unit may recognize the region of interest inputted by the input unit as the region to be printed.

DESCRIPTION OF THE PREFERRED EMBODIMENTS

Hereinafter, one embodiment of a printing apparatus according to the present invention will be described with reference to the drawings.

Figure 2:
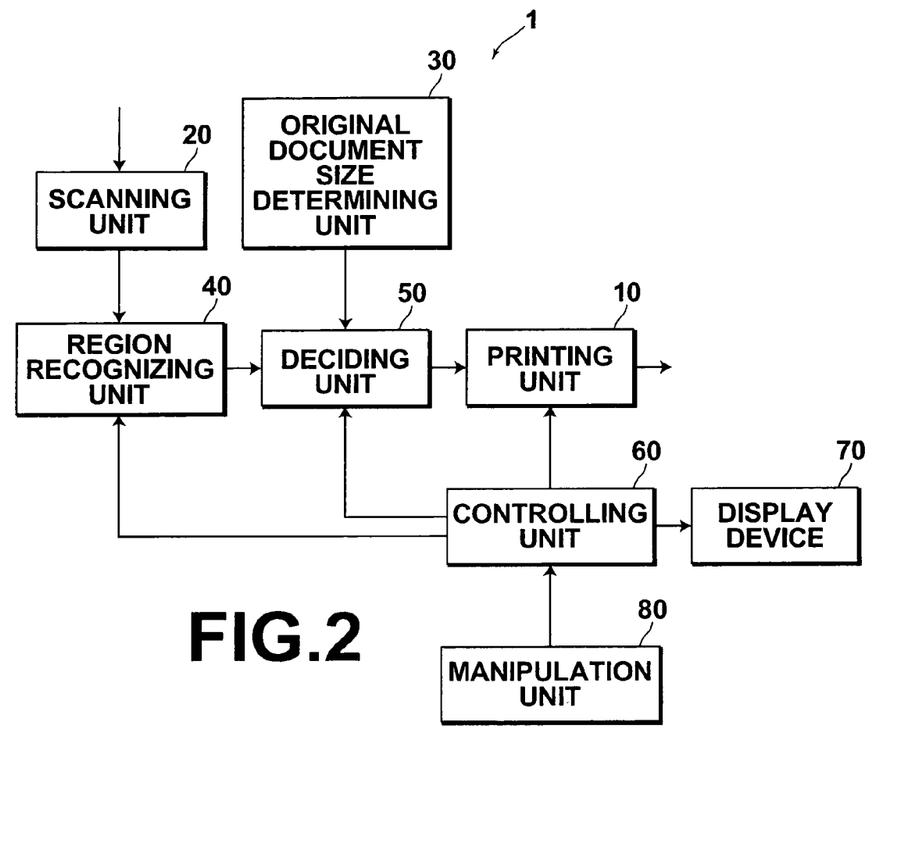
FIG. 2 is a block diagram illustrating one example of the functional configuration of a printing apparatus according to the present invention.

FIG. 2 is a block diagram illustrating one example of the functional configuration of the printing apparatus according to the invention. As shown in FIG. 2, the printing apparatus 1 includes: a printing unit 10 that can carry out printing selectively on one of print sheets having different sizes; a scanning unit 20 that scans an original document; an original document size determining unit 30 that determines the size of the original document; a region recognizing unit 40 that recognizes a region to be printed in the original document scanned by the scanning unit 20; a deciding unit 50 that compares the sizes of the print sheets printable by the printing unit 10 with the size of the original document determined by the original document size determining unit 30 and the size of the region to be printed recognized by the region recognizing unit 40 to decide a print sheet size that is larger than the region to be printed and smaller than the size of the original document; and a controlling unit 60 that exerts control to print the image of the region to be printed on a print sheet of the size decided by the deciding unit 50 at 100% magnification.

The printing apparatus 1 further includes a setting screen for allowing various settings during printing, a display device 70, such as a monitor, for displaying an image of the scanned original document, the region to be printed, and the like, and a operation unit 80 that allows the user to input various instructions.

The scanning unit 20 (scanner) scans an image of the original document placed on an original document platen and generates image data representing the scanned image.

The original document size determining unit 30 determines which of standard sheet sizes (for example, A3, A4, A5, B3, B4, B5, L and post card) the size of the original document corresponds to. The determination of the size of the original document is achieved by detecting presence or absence of the original document at predetermined portions on the original document platen. In a case where the original document is conveyed to the scanning unit 20 by feed rollers, a sensor for detecting an amount of movement of the original document and a sensor for detecting presence or absence of the original document may be disposed at a roller section at an inlet to the scanning unit 20, and the size of the original document may be determined based on results of the detection by these sensors.

Figure 3:
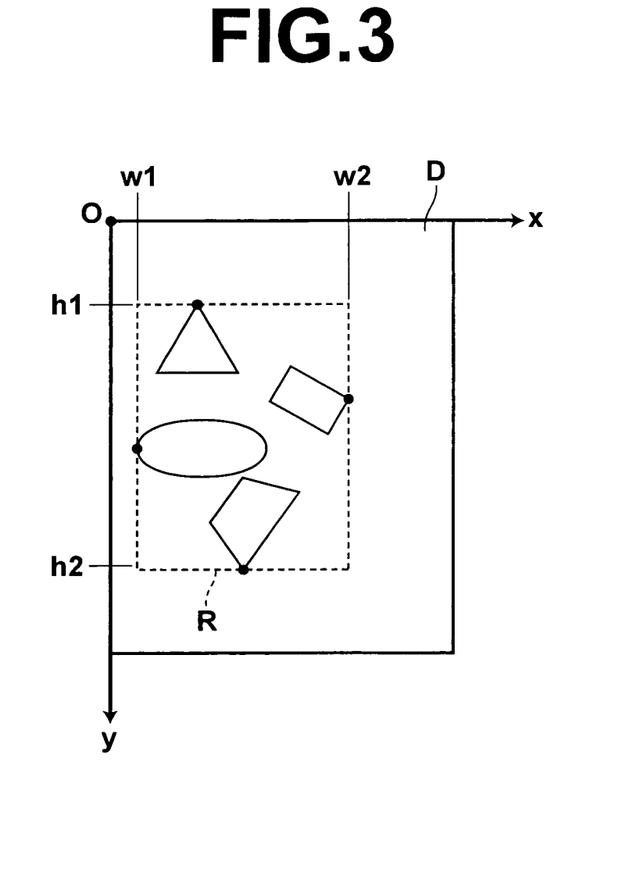
FIG. 3 is a diagram for explaining a process of recognizing a region to be printed by a region recognizing unit shown in FIG. 1.

The region recognizing unit 40 recognizes the region to be printed from the entire area of the original document scanned by the scanning unit 20. Specifically, the region recognizing unit 40 detects and recognizes the region to be printed R from image data of the original document scanned by the scanning unit 20. For example, as shown in FIG. 3, the upper left corner of image data D of the original document is set as a point of origin O, the horizontal direction is set as the X axis, and the vertical direction is set as the Y axis. Then, a classifier that determines whether or not a density value at each point exceeds a predetermined threshold scans from the point of origin O along the directions of the X axis and the Y axis to search regions in the image data D where the density values exceed the predetermined threshold, and a rectangular-region R containing these regions is determined as the region to be printed. A difference between the smallest value w1 and the largest value w2 of X coordinates of the respective points in the region where the density values exceed the predetermined threshold is a width along the horizontal direction of the region to be printed, and a difference between the smallest value h1 and the largest value h2 of Y coordinates is a width along the vertical direction of the region to be printed.

It should be noted that, in the process of detecting the region to be printed as described above, existing techniques such as isolated point removal and original document edge removal, which automatically remove small spots in a blank area of the original document and edge portions of the original document, may further be applied to prevent such spots from being erroneously detected as the region to be printed to improve the detection performance.

It should be noted that, although the region recognizing unit 40 recognizes the region to be printed through the automatic detection process in the above description, the image of the original document scanned by the scanning unit 20 may be displayed on the display device 70, and a region of interest inputted via the operation unit 80 may be recognized as the region to be printed. As the operation unit 80, various devices such as a mouse, a keyboard and/or a touch panel can be used.

The deciding unit 50 decides the print sheet size that is larger than the region to be printed and smaller than the size of the original document by comparing the sizes of the print sheets printable by the printing unit 10 with the size of the original document determined by the original document size determining unit 30 and the size of the region to be printed recognized by the region recognizing unit 40.

For example, if the size of the original document determined by the original document size determining unit 30 is A3 size (297 mm in the horizontal direction×420 mm in the vertical direction) and the size of the region to be printed in the original document recognized by the region recognizing unit 40 is 240 mm in the horizontal direction×280 mm in the vertical direction, and the sizes of the print sheets printable by the printing apparatus 1 include three sizes: A3 size (297 mm in the horizontal direction×420 mm in the vertical direction), B4 size (257 mm in the horizontal direction×364 mm in the vertical direction) and A4 size (210 mm in the horizontal direction×297 mm in the vertical direction), as shown in Table 1, then, the print sheet size that is larger than the region to be printed and smaller than the size of the original document in both the horizontal and vertical directions is the B4 size.

TABLE 1

|  | Horizontal Direction (mm) | Vertical Direction (mm) |
| --- | --- | --- |
| A3 | 297 | 420 |
| B4 | 257 | 364 |
| A4 | 210 | 297 |

Although a single print sheet size that is larger than the region to be printed and smaller than the size of the original document is determined in the above-described example, if, for example, the printing apparatus 1 is printable on three sizes of the print sheets as shown in Table 1, the size of the original document is A3, and the region to be printed is smaller than the A4 size, there are two print sheet sizes, i.e., B4 and A5, that meet the condition of being larger than the region to be printed and smaller than the size of the original document. If there are more than one print sheet sizes that meet the above condition, the size of the print sheet used for printing is determined by selecting the smallest size among such sizes, or by setting priorities between the sizes of the print sheets to be used for printing and selecting the size having the highest priority among the print sheet sizes.

It should be noted that the priorities are set in advance as default priorities before shipment, or set by the user via the operation unit 80 and stored in a memory (not shown) so that the priority setting can be referenced when the print sheet size is determined.

The controlling means 60 controls various units of the printing apparatus I according to signals fed from various processing units, such as the operation unit 80 and the deciding unit 50. For example, the controlling means 60 controls the printing unit 10 such that the image of the region to be printed is printed on a print sheet of the size decided by the deciding unit 50 at 100% magnification.

Further, the controlling means 60 displays the setting screen on the display device, receives instructions from the user via the operation unit 80, and stores the results of setting in the memory (not shown) to enable setting as to whether or not a smart smaller-sized sheet selection function is used, a processing pattern of a blank space during printing, and the like, before starting the print process. The "smart smaller-sized sheet selection function" refers to a function that carries out the process according to the invention, i.e., causes printing of the image of the region to be printed at 100% magnification on a print sheet that is larger than the region to be printed in the original document and smaller than the size of the original document. In the following description, it is assumed that the smart smaller-sized sheet selection function is set to "ON". It should be noted that the use of the smart smaller-sized sheet selection function and the processing pattern of the blank space may be set by the user, or may be set as default values and stored in the memory before shipment.

The processing pattern of the blank space is to set a position where the image is printed on the print sheet. For example, there are patterns such as right alignment in which the printed image is aligned to the right side of the print sheet, center alignment in which the printed image is aligned to the center in the horizontal direction of the print sheet, left alignment in which the printed image is aligned to the left side of the print sheet, top alignment in which the printed image is aligned to the top side of the print sheet, middle alignment in which the printed image is aligned to the middle in the vertical direction of the print sheet, and bottom alignment in which the printed image is aligned to the bottom side of the print sheet. In this manner, a layout of the printed document can be controlled by setting the processing pattern of the blank space.

Figure 4:
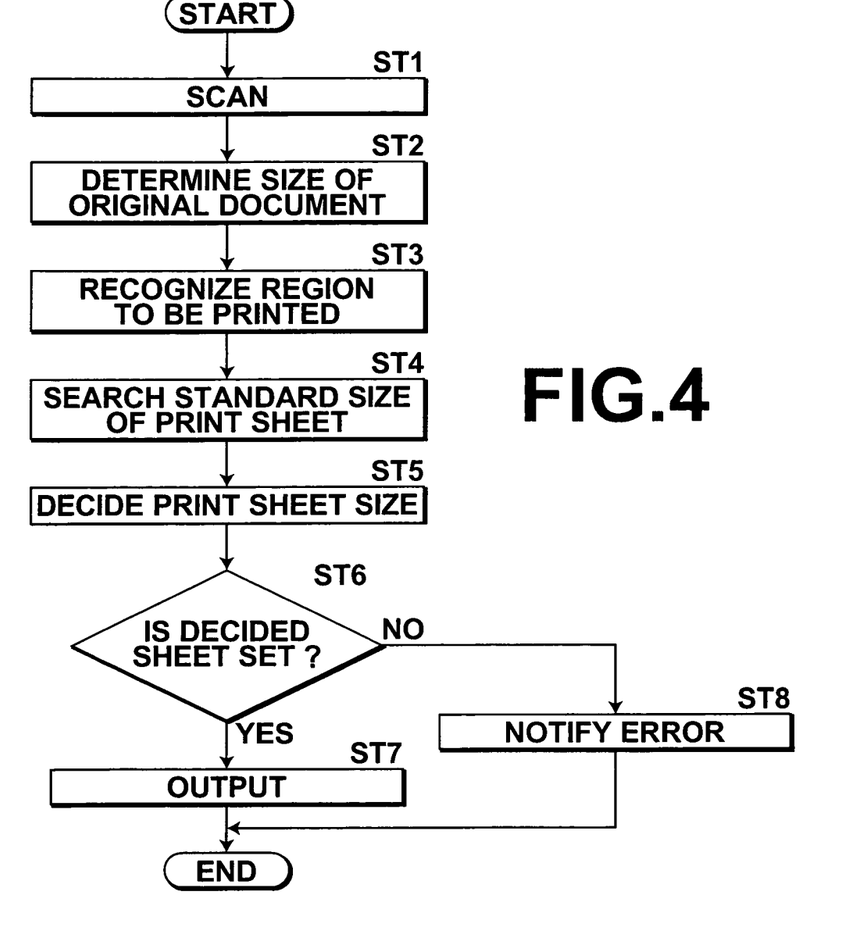
FIG. 4 is a flow chart illustrating a process carried out in the printing apparatus shown in FIG. 1.

Next, a process carried out in the printing apparatus 1 will be described. FIG. 4 is a flow chart illustrating one example of the process carried out in the printing apparatus 1.

The process begins with a print start instruction inputted via the operation unit 80, and the scanning unit 20 (scanner) scans an image of the original document placed on the original document platen to recognize image data of the original document (step ST1). Then, the original document size determining unit 30 determines the size of the original document (step ST2). Further, the region recognizing unit 40 recognizes a region to be printed from the image data of the original document (step ST3). Subsequently, the deciding unit 50 compares the sizes of the print sheets printable by the printing unit 10 with the size of the original document determined by the original document size determining unit 30 and the size of the region to be printed recognized by the region recognizing unit 40 to search the print sheet size that is larger than the region to be printed and smaller than the size of the original document (step ST4), and decides the size of the print sheet to be used for printing from one or more searched out print sheet sizes (step ST5). Then, determination is made as to whether or not a print sheet of the size decided by the deciding unit 50 is set (step ST6). If an affirmative determination is made in step ST6, the image of the region to be printed is printed on the print sheet of the determined size at 100% magnification (step ST7), and the process ends. On the other hand, if a negative determination is made in step ST6, the error is notified to the user by displaying an indication of error on the display device, for example (step ST8).

Figure 5:
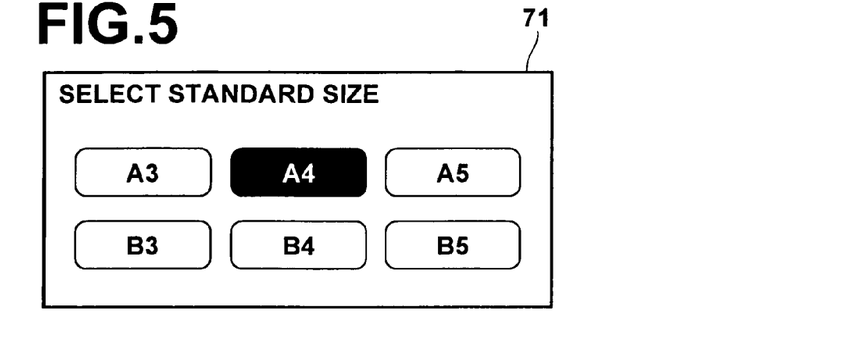
FIG. 5 illustrates a setting screen that is displayed on a display device to prompt a user to set a size of a print sheet.
Figure 6:
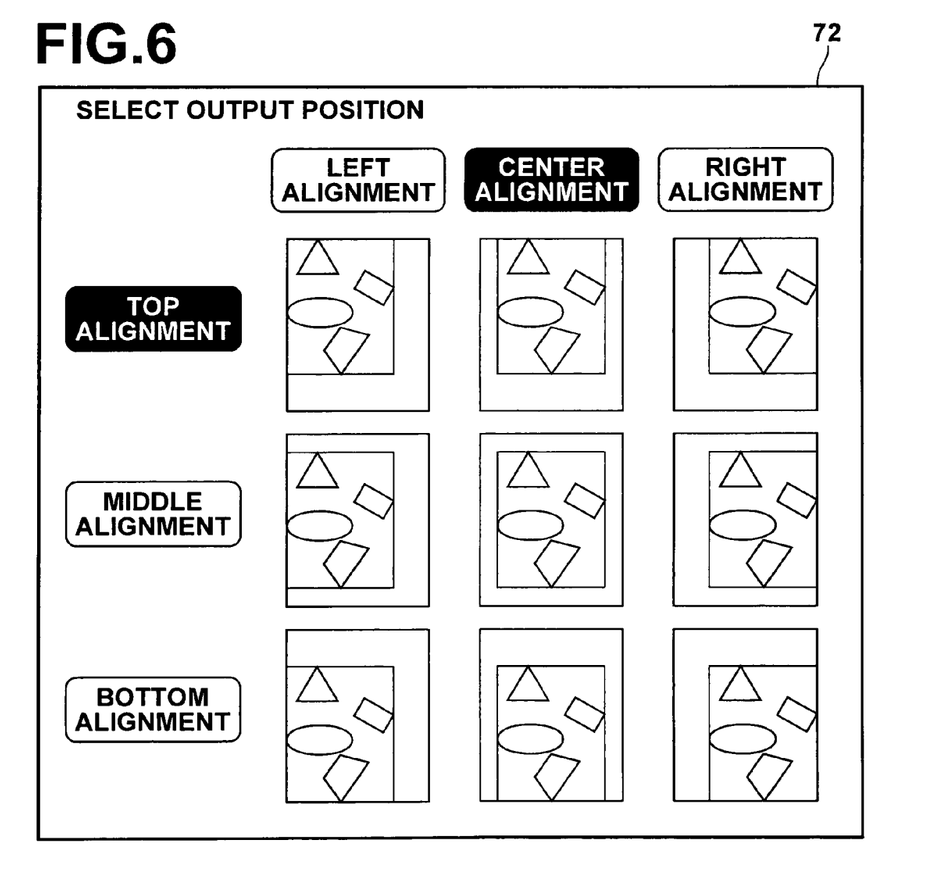
FIG. 6 illustrates a setting screen that is displayed on a display device to prompt the user to set a processing pattern of a blank space.

It should be noted that, in the above-described process, the region to be printed is printed on the print sheet of the size decided by the deciding unit 50 based on the processing pattern of the blank space that has been set in advance. However, for example, setting screens 71, 72, as shown in FIGS. 5 and 6, may be displayed on the display device after the process has begun with the print start instruction, and the user's instructions about the size of the print sheet used for printing, the processing pattern of the blank space, and the like, may be received via the operation unit 80, so that the printing process is carried out according to the results of setting.

Figure 7:
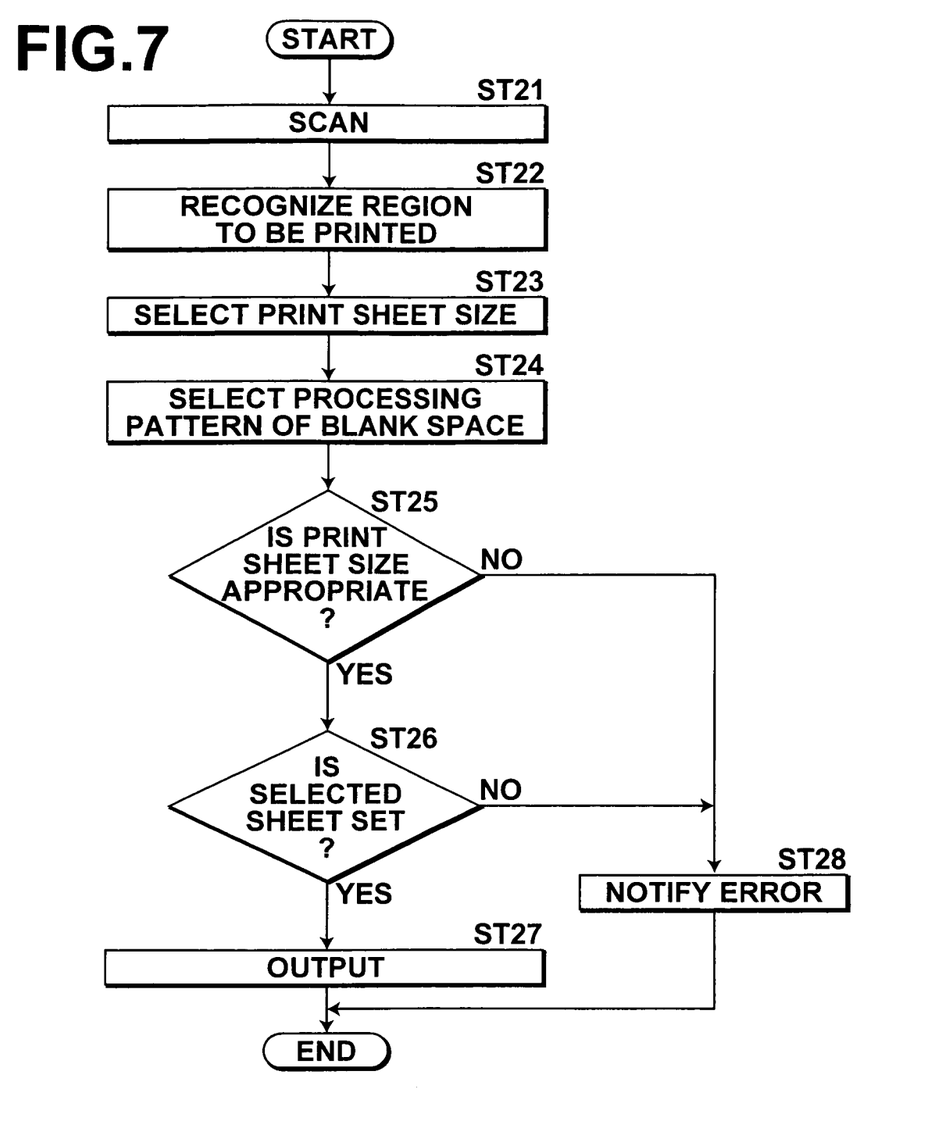
FIG. 7 is a flow chart illustrating an alternative process carried out in the printing apparatus shown in FIG. 1.

Now, another example of the process carried out in the printing apparatus 1 will be described with reference to the flow chart shown in FIG. 7.

The process begins with a print start instruction inputted via the operation unit 80, and the scanning unit 20 (scanner) scans an image of the original document placed on the original document platen to recognize image data of the original document (step ST21). Then, the region recognizing unit 40 recognizes a region to be printed from the image data of the original document (step ST22). Subsequently, the setting screen as shown in FIG. 5 is displayed on the display device to prompt the user to select a print sheet size which seems to be larger than the region to be printed and smaller than the size of the original document (step ST23). Further, the setting screen as shown in FIG. 6 is displayed on the display device to prompt the user to select a processing pattern of the blank space (step ST24).

Then, determination is made as to whether or not the print sheet size selected in step ST24 is larger than the region to be printed recognized in step ST22 (step ST25). If a negative determination is made in step ST25, the error is notified to the user by displaying an indication of error on the display device, for example (step ST28).

On the other hand, if an affirmative determination is made in step ST25, then, determination is made as to whether or not a print sheet of the size selected in step ST23 is set (step ST26). If an affirmative determination is made in step ST26, the image of the region to be printed is printed on the print sheet of the selected size at 100% magnification, based on the processing pattern of the blank space selected in step ST24 (step ST27), and the process ends. On the other hand, if a negative determination is made in step ST26, the error is notified to the user by displaying an indication of error on the display device, for example (step ST28).

According to the above-described processes, when an original document containing a blank space is scanned and printed, a region to be printed, such as a region in the original document where image information is contained, can be printed at 100% magnification on a print sheet that is larger than the region to be printed and smaller than the size of the original document, thereby reducing the blank space to allow efficient use of paper resources and avoiding lowering of legibility at the same time.

It should be noted that the present invention is applicable to various printing apparatuses, such as a screen printing apparatus, an electrostatic copier, an inkjet marking device, and a multi-function printing apparatus (MFP: Multi-Function Printer) employing a print engine used in such devices.

According to the present invention, the printing apparatus includes: a printing unit including a plurality of print sheets having different sizes, the printing unit being able to carry out printing selectively on any of the print sheets; an original document size determining unit to determine a size of an original document; a scanning unit to scan the original document; a region recognizing unit to recognize a region to be printed in the original document scanned by the scanning unit; a deciding unit to decide a print sheet size being larger than the region to be printed and smaller than the size of the original document by comparing the sizes of the print sheets with the size of the original document determined by the original document size determining unit and a size of the region to be printed recognized by the region recognizing unit; and a controlling unit to cause printing of an image of the recognized region to be printed at 100% magnification on one of the print sheets having the size decided by the deciding unit. Therefore, when an original document containing a blank space is scanned and printed, a region to be printed, such as a region containing image information of the original document, can be printed at 100% magnification on a print sheet that is larger than the region to be printed and smaller than the size of the original document, thereby reducing the blank space to allow efficient use of paper resources and avoiding lowering of legibility at the same time.

In the above-described apparatus, if there are more than one print sheet sizes being larger than the region to be printed and smaller than the size of the original document, the deciding unit may determine the smallest size among the print sheet sizes, thereby allowing efficient use of paper resources.

The above-described apparatus may further include a setting unit to set priorities between the sizes of the print sheets to be used for printing, and if there are more than one print sheet sizes being larger than the region to be printed and smaller than the size of the original document, the deciding unit may determine a size having the highest priority set by the setting unit among the print sheet sizes, thereby allowing efficient use of paper resources and improving convenience of the user.

What is claimed is:

1. A printing apparatus comprising:
  a printing unit comprising a plurality of print sheets having different sizes, the printing unit being able to carry out printing selectively on any of the print sheets;
  an original document size determining unit to determine a size of an original document;
  a scanning unit to scan the original document having blank spaces and an image;
  a region recognizing unit to recognize a region to be printed in which the image is present from within the original document scanned by the scanning unit;
  a deciding unit to decide a print sheet size being larger than the region to be printed and smaller than the size of the original document by comparing the sizes of the print sheets with the size of the original document determined by the original document size determining unit and a size of the region to be printed recognized by the region recognizing unit; and
  a controlling unit to cause printing of an image of the recognized region to be printed at 100% magnification on one of the print sheets having the size decided by the deciding unit.

2. The printing apparatus as claimed in claim 1, wherein, if there are more than one print sheet sizes being larger than the region to be printed and smaller than the size of the original document, the deciding unit decides the smallest size among the print sheet sizes.

3. The printing apparatus as claimed in claim 1 further comprising a setting unit to set priorities between the sizes of the print sheets to be used for printing, wherein, if there are more than one print sheet sizes being larger than the region to be printed and smaller than the size of the original document, the deciding unit decides a size having the highest priority set by the setting unit among the print sheet sizes.

4. The printing apparatus as claimed in claim 1, wherein the region recognizing unit automatically detects and recognizes the region to be printed.

5. The printing apparatus as claimed in claim 1, wherein
  the region recognizing unit comprises a display unit to display an image scanned by the scanning unit, and an input unit to input specification of a region of interest within the image displayed on the display unit, and
  the region recognizing unit recognizes the region of interest inputted by the input unit as the region to be printed.

6. The printing apparatus as claimed in claim 2, wherein the region recognizing unit automatically detects and recognizes the region to be printed.

7. The printing apparatus as claimed in claim 2, wherein
  the region recognizing unit comprises display unit to display an image scanned by the scanning unit, and
  an input unit to input specification of a region of interest within the image displayed on the display unit, and the region recognizing unit recognizes the region of interest inputted by the input unit as the region to be printed.

8. The printing apparatus as claimed in claim 3, wherein the region recognizing unit automatically detects and recognizes the region to be printed.

9. The printing apparatus as claimed in claim 3, wherein
  the region recognizing unit comprises display unit to display an image scanned by the scanning unit and an input unit to input specification of a region of interest within the image displayed on the display unit, and
  the region recognizing unit recognizes the region of interest inputted by the input unit as the region to be printed.

* * * * *